July 20, 1965     D. G. STRATTON     3,195,439
VEHICLE BODY STRUCTURE WITH AIR EXHAUST MEANS
Filed March 23, 1962
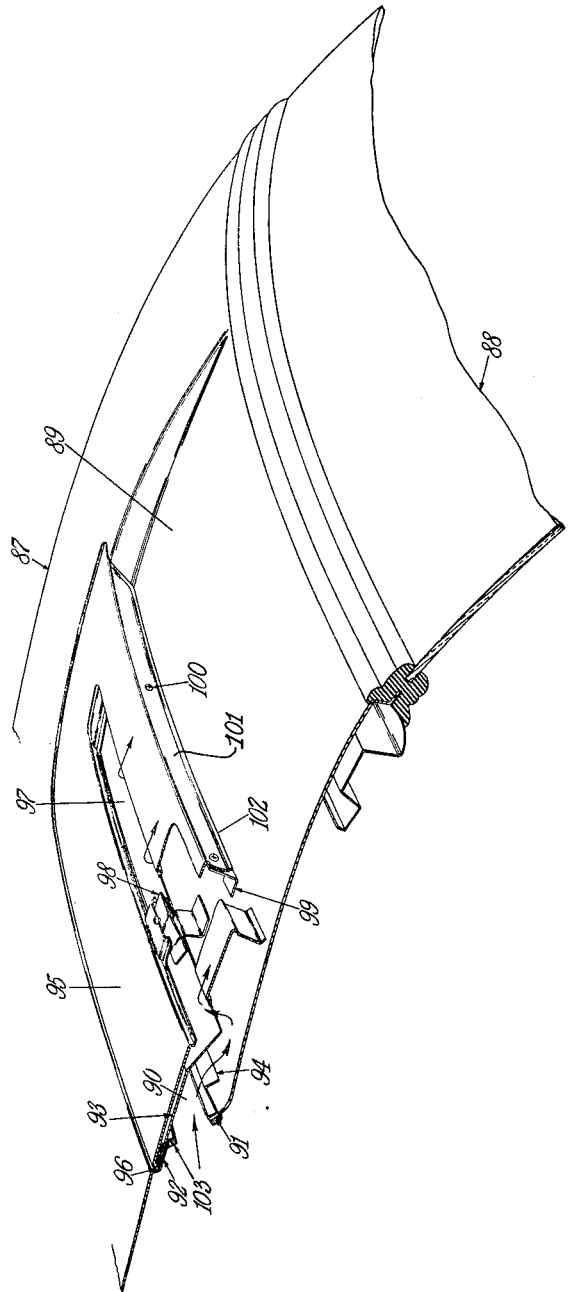
DESMOND G. STRATTON
INVENTOR
BY *John R. Faulkner*
    *John J. Loethel*
ATTORNEYS 3,195,439
VEHICLE BODY STRUCTURE WITH AIR EXHAUST MEANS
Desmond G. Stratton, Sutton Coldfield, England, assignor to Ford Motor Company, Dearborn, Mich., a corporation of Delaware
Filed Mar. 23, 1962, Ser. No. 181,904
7 Claims. (Cl. 98—2)

This invention relates to a body structure for vehicles and more particularly to a roof construction for motor vehicles which provides for the exhaust of air from the interior of the vehicle.

In conventional motor vehicles the heating and ventilating system comprises an air intake plenum chamber preferably located in the body cowl structure and a blower system connected to the plenum chamber for forceable distribution of heated or unheated air into the passenger compartment. Generally, no specific provision is made for the exhaust of air from the passenger compartment; yet, such air exhaust is desirable for several reasons. If air is not exhausted from the vehicle, it will result in poor air circulation and distribution, and foggy windows due to increased moisture content of the air in the passenger compartment besides causing a pressure build up in the vehicle which results in inefficient blower operation. Air may be exhausted by opening the vent or side windows but this sets up drafts and permits the ingress of dust and water.

According to the present invention, the necessary exhaust of air is achieved by providing an exhaust opening in the vehicle roof and additional paneling in the region of the opening to prevent the ingress of water. The exhaust opening is located on the roof at a position where the normal pressure is subatmospheric when the vehicle is moving, thus assisting the extraction of air and inhibiting the ingress of dust and water.

In the preferred illustrated embodiment of this invention the roof panel of the vehicle has a depression which extends forwardly from the rear window. An air intake opening is provided at the forward end of the depression where the depression rises to meet the normal roof contour. The roof cover panel is installed so that it extends as a continuation of the normal roof contour rearwardly to overlap the forward portion of the depression in the roof panel. This cover panel is provided with a laterally extending exhaust opening and a rear wall which extends downwardly and terminates just above the surface of the depression to allow any water accumulated in the space defined by the roof cover panel and the overlapped portion of the depression to drain rearwardly along the surface of the depression. Baffles and splash guards are provided intermediate the intake and exhaust openings in the space between the roof cover panel and the depression to prevent the ingress of water and dust into the vehicle body.

Other objects, advantages and features of the present invention will be made more apparent as this description proceeds, particularly when considered in connection with the accompanying drawing which is a perspective view of the rear portion of the vehicle roof illustrating the construction and arrangement of the roof structure partially in section embodying this invention.

Referring now to the drawing, there is seen a vehicle roof panel 87 and a backlite glass window 88. Roof panel 87 is formed with a depression 89 at its center below the normal surface of the roof contour. An intake opening 90 is provided in the front surface 91 connecting the depression 89 with the normal roof contour. The depression 89 extends rearwardly from this front surface 91 until it meets the normal roof contour in the vicinity of the rear edge of the roof panel 87. An indented portion 92 in the roof panel 87 located forwardly of the depression 89 receives a splash guard panel 93 which extends rearwardly into the depressed area. A laterally extending water baffle panel 94 is secured to the roof panel 87 in the depression 89 just rearwardly of the front surface 91.

A cover panel 95 is installed over the roof panel 87 which in part overlaps the front portion of the depression 89 to provide a continuation of the normal roof contour. The forward portion of the cover panel 95, which mates with the indented surface 92 of the roof panel 87, is provided with a seal 96 interposed between the roof panel 87 and the splash guard panel 93 to tightly seal the joints between the panels. The cover panel 95 may be welded to the indented surface 92 if desired and the seal 96 may be in the form of a suitable welding sealer. The cover panel 95, which has at least one laterally extending exhaust opening 97, may be located and attached to the roof panel 87 by means of suitable brackets as shown at 98 and 99. Screws 100 or other fastening means may be utilized to secure the cover panel 95 to the brackets 98 and 99. The cover panel 95 also has a downwardly extending rear wall 101 which is attached to bracket 99 in such a manner so to leave a narrow gap to define a slit 102 between the depression 89 and the cover panel 95.

The headlining material (not shown) may be affixed to the front surface 91 and covered with an edging material 103 to hold it in position.

As can be seen from the description, air flows from the interior of the vehicle under pressure supplied by the conventional positive ventilation system of the vehicle. Additional flow of air is achieved by the position of the exhaust opening 97 which is located at a point where a negative pressure is produced at its surface when air passes over the roof panel 87 during the movement of the vehicle. This negative pressure and the positive pressure from within the vehicle body induce the flow of air from the interior of the vehicle through intake opening 90 over the baffle 94 and around the end of the splash panel 93 until it is exhausted through exhaust opening 97.

Any water flowing or falling into the exhaust opening 97 will be intercepted by the splash guard panel 93 from where it will flow onto the depression 89 in the roof panel 87. From the depression 89 the water will run rearwardly along the downwardly sloping surface of the roof panel 87 through the slit 102 intermediate the roof panel 87 and the rear wall 101 of the cover panel 95. From the surface of the roof panel 87 the water will continue to flow over the various surfaces of the vehicle body to the road pavement in the usual manner.

As shown in the illustrated embodiment, the roof construction of this invention is located close to the rear of the vehicle body where the normal pressure is usually subatmospheric.

It will be understood that this invention is not to be limited to the exact construction shown and described but that various changes and modifications may be made without departing from the spirit and scope of the invention as defined in the appended claims.

I claim:

1. In a vehicle body, a roof construction for said vehicle body providing for the exhaust of air therefrom, a first roof panel extending from the front towards the rear of said vehicle body and having a substantially centrally located depression, a second roof panel joined to said first roof panel and overlapping the forward portion of said depression to define a space therebetween, an intake opening adjacent the juncture of said first and second roof panels to place said space in communication with the interior of said vehicle body, an exhaust opening in said second roof panel longitudinally and rearwardly spaced from said intake opening, at least one set of baffles in said space between said intake opening and said exhaust opening to prevent the flow of water into the interior of said vehicle body, and a separate drainage opening longitudinally and rearwardly spaced from said intake and exhaust openings to allow for the drainage of water from the space between said overlapping roof panels from said depression to the exterior of the vehicle body.

2. In a vehicle body, a roof construction for said vehicle body providing for the exhaust of air therefrom, a generally longitudinally extending first roof panel having a medially depressed surface that slopes rearwardly and downwardly from a line intermediate the ends of said roof panel, a second roof panel having a juncture with said first roof panel and overlapping the forward portion of said depressed surface to define a space therebetween, an intake opening substantially beneath the juncture of said first and second roof panels to place said space in communication with the interior of said vehicle body, at least one laterally extending exhaust opening in said second roof panel longitudinally and rearwardly spaced from said intake opening, at least one set of baffles in said space between said gitudinally and rearwardly spaced from said intake opening between said depressed surface and said second roof panel longitudinally and rearwardly spaced from said intake and exhaust openings to place said space in communication with the portion of said depressed surface not overlapped by said second roof panel to allow for the drainage of water from said depressed surface to the exterior of the vehicle body.

3. In a vehicle body, a roof vent construction for said vehicle body providing for the exhaust of air therefrom, a first roof panel having a medially depressed surface that slopes rearwardly and downwardly from a line intermediate the ends of said roof panel, a second roof panel having a juncture with said first roof panel and extending as a continuation of the contour of said first roof panel to overlap a forward portion of said depressed surface to define a space therebetween, said second roof panel having a downwardly extending rear wall to fit said depressed surface, an intake opening in said first roof panel adjacent the juncture of said depressed surface and said second roof panel to place said space in communication with the interior of said vehicle body, at least one laterally extending exhaust opening in said second roof panel longitudinally and rearwardly spaced from said intake opening, at least one set of baffles in said space between said intake and exhaust openings, and a laterally extending slit between said rear wall of said second roof panel and said depressed surface to place said space in communication with the exterior of said vehicle body.

4. In a vehicle body, a roof vent construction for said vehicle body providing for the exhaust of air from the rear of said vehicle body including a generally longitudinally extending roof panel, a depression in the center of said roof panel beginning at its rearward edge and terminating in a front surface intermediate the front and rear edges of said roof panel, said roof panel having an indented surface forward of said depression, a cover panel having its forward portion received by said indented surface and its remaining portion overlapping a portion of said depression to define a space therebetween, said cover panel being of the same general contour as said roof panel and having a downwardly extending rear wall substantially fitting the cross sectional area of said depression and terminating just above the surface of said depression to define a slit between said panels, an intake opening in said front surface of said depression, at least one laterally extending exhaust opening in said cover panel longitudinally and rearwardly spaced of said intake opening, and at least one set of baffles in said space intermediate said intake and exhaust openings to provide a water barrier therebetween.

5. In a vehicle body, a roof vent construction for said vehicle body providing for the exhaust of air from the rear of said vehicle body including a generally longitudinally extending roof panel, a depression in the center of said roof panel beginning at its rearward edge and extending forwardly and terminating in a front surface intermediate the front and rear edges of said roof panel, said roof panel having an indented surface forward of said depression, a cover panel having its forward portion received by said indented surface and its remaining portion overlapping the forward portion of said depression to define a space therebetween, said cover panel having a downwardly extending rear wall substantially fitting the cross sectional area of said depression, a bracket supporting said cover panel and its rear wall and adapted to maintain a drainage opening between said rear wall and said depression, an intake opening in said front surface of the depression, a plurality of laterally extending exhaust openings in said cover panel longitudinally and rearwardly spaced from said intake opening, and baffle and splash guard means in said space and intermediate said intake opening and exhaust openings to prevent the flow of water from the exterior of the vehicle body into the interior thereof.

6. In a vehicle body, a roof vent construction for said vehicle body providing for the exhaust of air from the rear of said vehicle body including a generally longitudinally extending roof panel, a depression in the center of said roof panel beginning at its rearward edge and extending forwardly and terminating in a front surface intermediate the front and rear edges of said roof panel, said roof panel having an indented surface forward of said depression, a cover panel having its forward portion received by said indented surface and its remaining portion overlapping the forward portion of said depression to define a space therebetween, said cover panel being of the same general contour as said roof panel and having a downwardly extending rear wall substantially fitting the cross sectional area of said depression and terminating just above the surface of said depression to define a drainage slit between said panels, an intake opening in said front surface of said depression, at least one laterally extending exhaust opening in said cover panel longitudinally and rearwardly spaced from said intake opening, a baffle affixed to said cover panel and a splash guard affixed to said depression extending into said space intermediate said intake and exhaust openings to prevent the flow of water from the exterior of the vehicle body into the interior thereof.

7. A motor vehicle body having a roof panel, a medially positioned depression in said roof panel beginning at the rearward edge of the latter and extending forwardly and terminating in an angularly inclined wall intermediate the front and rear edges of said roof panel, said roof panel having an indented surface forward of said wall, a cover panel extending as a continuation of the normal roof contour and having its forward portion received by said indented surface and its remaining portion overlapping a portion of said depression to define a space therebetween, said cover panel having a downwardly extending rear wall substantially fitting the cross sectional area of said depression and terminating just above the surface of said depression to define a drain slit therebetween, an intake opening in said wall of said depression, at least one laterally extending exhaust opening in said cover panel longitudinally and rearwardly spaced from said intake opening, and a splash guard panel having a first portion received intermediate the forward portion of said cover panel and said indented surface of said roof panel and having its remaining portion extending rearwardly into said space and terminating between the intake opening and exhaust opening.

References Cited by the Examiner

UNITED STATES PATENTS

| | | | |
|---|---|---|---|
| 1,539,534 | 5/25 | Ansell | 98—2.7 |
| 2,201,252 | 5/40 | Van Ranst | 98—2 |
| 2,972,939 | 2/61 | Tomlinson | 98—2 |

FOREIGN PATENTS 404,942   1/34   Great Britain.

ROBERT A. O'LEARY, *Primary Examiner.*

PHILIP ARNOLD, MEYER PERLIN, *Examiners.*